(No Model.) 8 Sheets—Sheet 1.

A. LATHAM.
MACHINE FOR FORMING COUNTERBORES, REAMERS, AND COUNTERSINKS.

No. 339,197. Patented Apr. 6, 1886.

Fig. 1.

Witnesses:
Robert Ashe
Eugene Humphrey

Inventor:
Albert Latham
per Porter & Hutchinson
Attys

(No Model.) 8 Sheets—Sheet 4.

A. LATHAM.
MACHINE FOR FORMING COUNTERBORES, REAMERS, AND COUNTERSINKS.

No. 339,197. Patented Apr. 6, 1886.

Witnesses:
Robert Ashe
Eugene Humphrey

Inventor:
Albert Latham
per Peter & Hutchinson Attys.

(No Model.) 8 Sheets—Sheet 5.

A. LATHAM.
MACHINE FOR FORMING COUNTERBORES, REAMERS, AND COUNTERSINKS.

No. 339,197. Patented Apr. 6, 1886.

Witnesses
Robert Ashe
Eugene Humphrey

Inventor
Albert Latham
per Porter & Hutchinson
Attys

N. PETERS, Photo-Lithographer, Washington, D. C.

(No Model.) 8 Sheets—Sheet 6.

A. LATHAM.
MACHINE FOR FORMING COUNTERBORES, REAMERS, AND COUNTERSINKS.

No. 339,197. Patented Apr. 6, 1886.

Witnesses
Robert Ash
Eugene Humphrey

Inventor
Albert Latham
per Porter & Hutchinson Attys (No Model.) 8 Sheets—Sheet 7.

A. LATHAM.
MACHINE FOR FORMING COUNTERBORES, REAMERS, AND COUNTERSINKS.

No. 339,197. Patented Apr. 6, 1886.

Witnesses
Robert Ashe
Eugene Humphrey Inventor
Albert Latham
per Porter & Hutchinson Atty (No Model.)  8 Sheets—Sheet 8.

A. LATHAM.
MACHINE FOR FORMING COUNTERBORES, REAMERS, AND COUNTERSINKS.

No. 339,197. Patented Apr. 6, 1886.

Witnesses
Robert Ashe
Eugene Humphrey

Inventor
Albert Latham
per Porter & Hutchinson Attys

UNITED STATES PATENT OFFICE.

ALBERT LATHAM, OF WALTHAM, MASSACHUSETTS.

MACHINE FOR FORMING COUNTERBORES, REAMERS, AND COUNTERSINKS.

SPECIFICATION forming part of Letters Patent No. 339,197, dated April 6, 1886.

Application filed September 25, 1884. Serial No. 144,005. (No model.)

*To all whom it may concern:*

Be it known that I, ALBERT LATHAM, of Waltham, in the county of Middlesex and State of Massachusetts, have invented a new and useful Improvement in Counterbores, Reamers, and Countersinks, and in the Manufacture Thereof, which will, in connection with the accompanying drawings, be hereinafter fully described, and specifically defined in the appended claims.

This invention relates to counterbores, reamers, and countersinks; and it consists in the machine employed for their production, as will, in connection with the accompanying drawings, be hereinafter particularly and fully set forth and claimed.

In said drawings, Fig. 38, Sheet 6, is an end elevation taken at the right hand of Fig. 37, with a diagram illustrative of the movement of the backing-off tool, which in due course will be explained. Fig. 39, Sheet 6, is an elevation taken at the right hand of Fig. 36.

Before proceeding to describe my machine by which I construct my improved counterbores, reamers, and countersinks, I deem it proper first to refer to and briefly describe said tools, both as heretofore constructed and as constructed by my improved method and machine, referring in such description to the illustrations in the drawings, which are pertinent thereto.

Figures 4, 8, 9, 13, 14, 15, 16, 17:
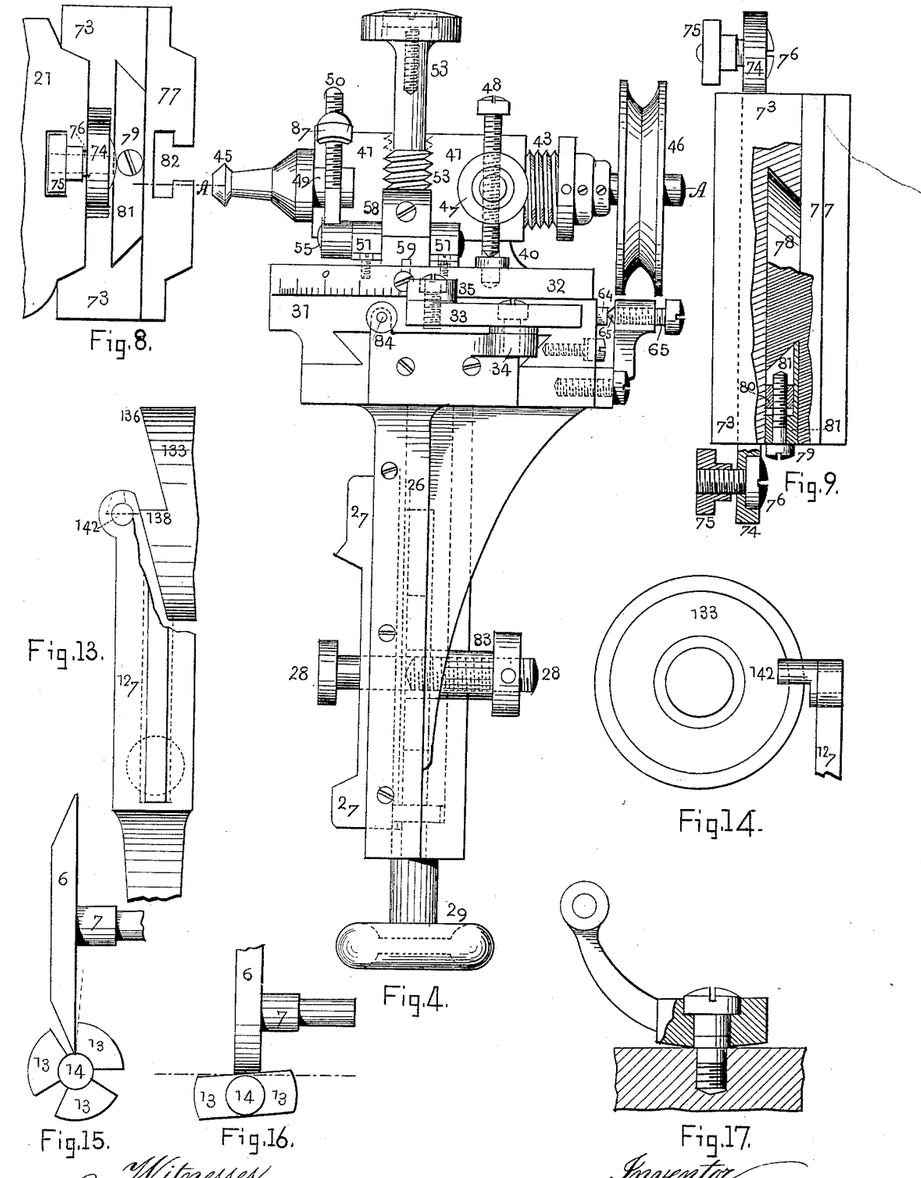
Fig. 4 is a detached elevation taken as viewed from the same standpoint as Fig. 3, and showing the milling portion of my machine.
Fig. 8, Sheet 4, is a detached elevation taken from the same standpoint as Fig. 1, and showing an attachment by which the milling devices are adapted to mill tapering counterbores, reamers, and countersinks.
Fig. 9, Sheet 4, is a plan view of parts shown in Fig. 8, but omitting the lathe-bed, certain parts being partially broken away to show the interior construction.
Fig. 13, Sheet 4, is a detached elevation showing a modification in the cam by which the cutting-tool is actuated when in the cut.
Fig. 14, Sheet 4, is a detached elevation taken as from the left in Fig. 13.
Fig. 15, Sheet 4, is an elevation showing the method of grinding the counterbores on radial lines.
Fig. 16, Sheet 4, is an elevation showing the method of grinding the counterbores on tangential lines.
Fig. 17, Sheet 4, is a sectional elevation illustrating the defective operation of imperfect counterbores.
Figures 21, 22, 23, 24, 25, 26, 27, 28, 29, 30:
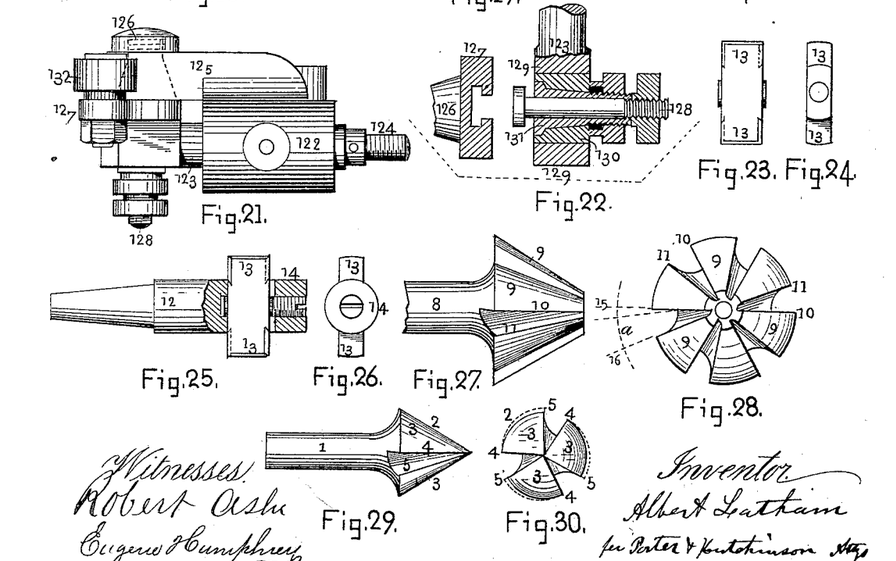
Fig. 21, Sheet 7, is a plan view of the parts shown in Fig. 10.
Fig. 22, Sheet 7, is a horizontal section taken as on line E E, Figs. 10, 19, 20.
Fig. 23, Sheet 7, is a side elevation of a detachable counterbore-cutter of my improved construction.
Fig. 24, Sheet 7, is an edge elevation of the cutter shown in Fig. 23.
Fig. 25, Sheet 7, represents the cutter shown in Figs. 23 and 24 as mounted in its actuating-shank.
Fig. 26, Sheet 7, is an elevation of the parts shown in Fig. 25, taken as viewed at the right hand thereof.
Fig. 27, Sheet 7, is a side elevation of a tapered reamer formed by my improved method and machine.
Fig. 28, Sheet 7, is an end elevation taken as viewed from the right in Fig. 27.
Fig. 29, Sheet 7, is a side elevation of a countersink formed by my improved method and machine.
Fig. 30, Sheet 7, is an end elevation taken as viewed from the right in Fig. 29.

Countersinks are formed as shown in Figs. 29 and 30, Sheet 7—that is to say, they are formed with a suitable shank, 1—to be secured in the rotary spindle by which they are driven, and a conical head, 2, which latter is subdivided by grooves into the desired number of lips, (marked 3,) the cutting or front face, 4, of each of which, and the rear face, 5, of the preceding lip, constituting the groove or space between such lips, said lines 4 being radial and adapted to be sharpened by means of a rotary grinding-disk, 6, mounted on an arbor, 7, as shown in Fig. 15, Sheet 4, where the positions of the grinding-disk and tool, when the latter is being sharpened, are clearly shown. The peripheral face of each lip 3 is cut away, or, as it is termed, "backed off," from the front line or face, 4, to the rear line or face, 5, as shown in Fig. 30, in order to give the requisite clearance, as thereby line 4 is of greater length than any radial line that could be drawn from the center to the periphery at any point between face 4 and face 5.

Reamers are usually tapered with a greater or less obliquity of side lines, and are formed with a shank, 8, (see Fig. 27, Sheet 7,) by which to rotate them, and are subdivided upon the periphery into the lips 9, the front cutting-faces, 10, of which are radial, and the back faces, 11, are oblique to a radial line, said faces 10 and 11 resulting from the subdivision of the periphery of the reamer into lips 9 by forming the grooves in said periphery. The lips 9 are backed off to give the requisite clearance, as shown by dotted lines in Fig. 28, and as described with reference to Figs. 29 and 30. This reamer is susceptible of being sharpened by means of a grinding-disk in the manner shown in Fig. 15, and as already referred to with reference to countersinks, and as will be still further described in connection with the description of counterbores.

It is to be said of counterbores, first, that they are formed with the front or cutting face of their lips either tangential to the periphery of the stem or radial from the center, and when tangential they have usually but two lips, which may be either an integral part of the body, or may be inserted therein, and when radial they may have any practical number of lips, from two upward, according to the size of the counterbore.

Figures 46, 47, 48, 49, 50, 51, 52, 53:
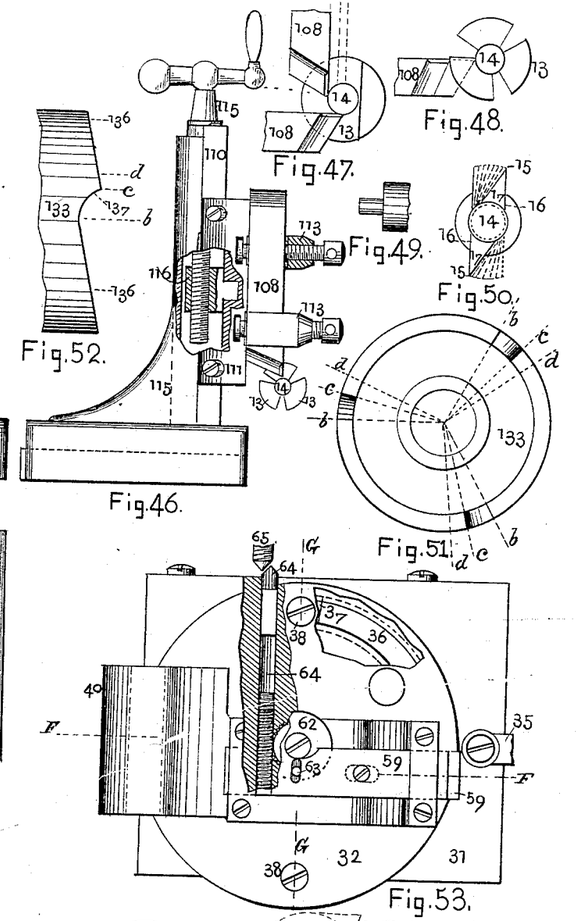
Fig. 46, Sheet 8, is an elevation taken as from the left of Figs. 44 and 45.
Fig. 47, Sheet 8, shows in end elevation a tangential counterbore, with the cutting-tool in both a vertical and horizontal position for backing off the end faces of the lips.
Fig. 48, Sheet 8, shows a three-lip radial counterbore in end elevation, with the cutting-tool in proper position for backing off the same.
Fig. 49, Sheet 8, is a detached side elevation, showing the lower portion of a counterbore in its relation to the backing-off tool shown in Fig. 44.
Fig. 50, Sheet 8, shows the method of grinding the tangential counterbore, the spaces shown by dotted lines indicating the portion ground away by repeated sharpening.
Fig. 51, Sheet 8, is a front elevation of the three-throw cam employed in backing off my counterbores.
Fig. 52, Sheet 8, is a side elevation of the cam shown in Fig. 51, and is taken as viewed from the left in that figure.
Fig. 53, Sheet 8, is a top or plan view of the milling-fixture, and showing the rotary adjustment and tripping devices.

Figs. 23, 24, 25, 26, Sheet 7, Figs. 31, 32, 33, 34, Sheet 6, Figs. 47, 50, Sheet 8, and Fig. 16, Sheet 4, represent tangential counterbores, and Fig. 15, Sheet 4, Figs. 35, 36, 37, 38, 39, Sheet 6, and Fig. 48, Sheet 8, represent radial counterbores, and said Figs. 25, 26, Sheet 7, represent tangential counterbores whose cutting-lips are inserted, while Figs. 23, 24, same sheet, represent the removable lips as detached from the stock or shank.

For convenience of reference the respective corresponding parts of all the counterbores will be marked with the same indicating numeral; and in accordance with such system the body of each counterbore is marked 12, the lips are marked 13, the stem, pin, or "teat," as it is termed, 14, the front longitudinal face of the lips, 15, the back longitudinal face, 16, and the transverse spiral face, 17.

In order to give the required and proper clearance to the transverse or end faces, 17, of the lips 13, whether the same are tangential or radial, said faces must retire from the front or cutting line, 15, to the rear longitudinal line, 16, by a spiral line, which may have either a uniform or accelerated pitch; as the use, whether general or special, of the counterbore may render desirable; and such spiral line of the end face of the lips must, in order to produce perfect results, be identical in pitch in all the lips of the same counterbore; and not only must the pitch of each lip be the same in a counterbore, but the angle of face 17 of each lip must be precisely the same relatively to the axis of body 12 throughout the entire spiral path of said face 17—that is to say, if the lines of faces 17 at their intersection with front line, 15, when the counterbore is first formed, are at right angles with the axis of the counterbore, then at any and every radial line that can be projected upon said spiral faces 17 they should be at right angles to said axis; and if the angle of faces 17 be any other than a right angle relatively to the axis at one radial point, they should at all radial points be at the same angle to the axis; and by means of my method and machine I so form the end faces of the lips of the counterbores that at all stages or points of their being ground away on the longitudinal lines 15, so long as the same are kept radial, the end face at its intersection with said line 15 will maintain an unvarying angle relative to the axis. The importance of so maintaining a uniform facial angle is exemplified in Fig. 40, Sheet 6, where the usual right-angled head, 18, of the screw is seated upon the counterbored blank 20, only at a line immediately surrounding the stem 19 of the screw, the facial angle of the counterbore having varied from the right angle as at first constructed.

Figures 11, 12, 31, 32, 33, 34, 35, 36, 37, 40, 41, 42, 43:
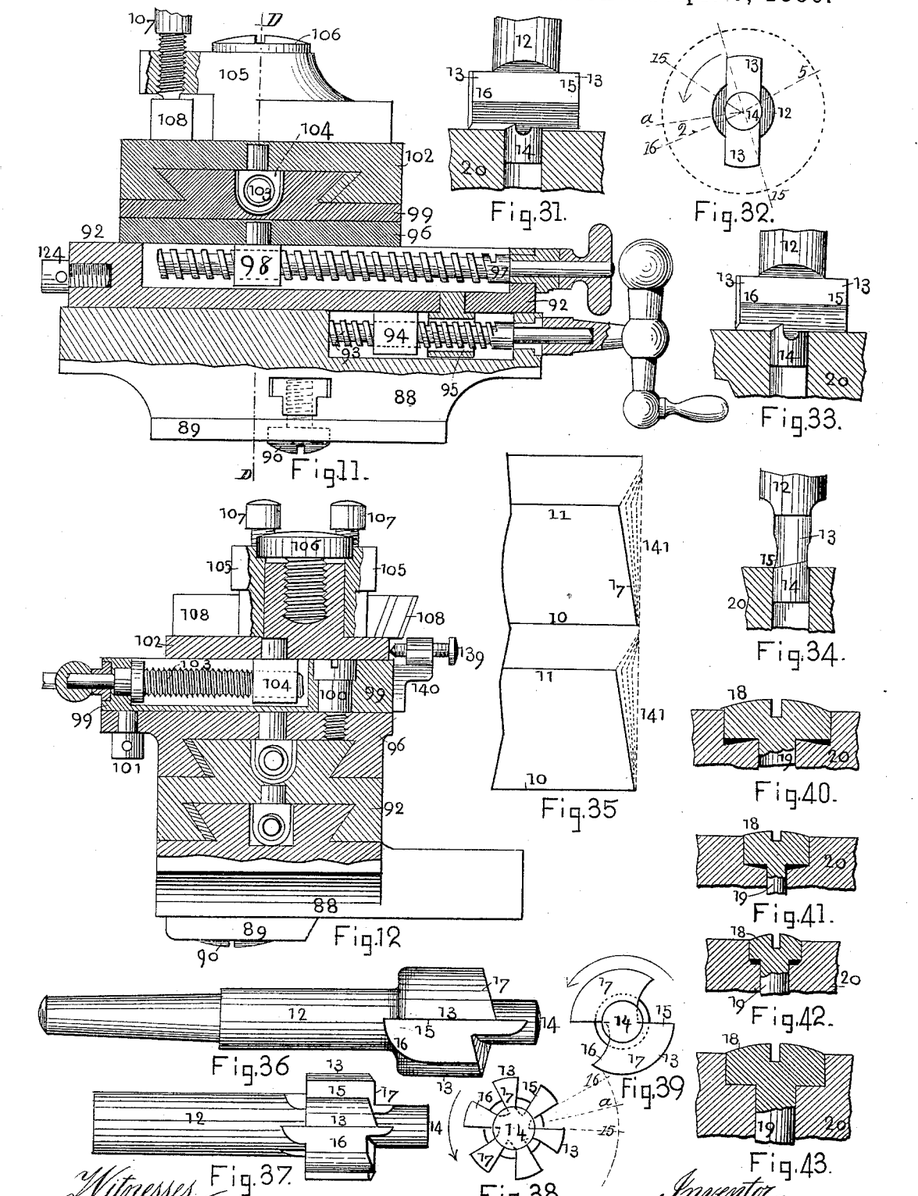
Fig. 11, Sheet 6, is a detached vertical section taken on line C C, Fig. 1, through the cutting-tool-carrying slides, and showing the actuating and adjusting screws in elevation.
Fig. 12, Sheet 6, is a vertical transverse section taken as on line D D, Fig. 11, and as viewed from the right in Figs. 1, 2, and 11.
Fig. 31, Sheet 6, is a sectional side elevation, showing a two-lip counterbore in position for working, but imperfect in its construction, in that one lip is longer than the other, as shown.
Fig. 32, Sheet 6, is an end elevation of a two-lip counterbore shown in Fig. 33, with a diagram illustrating the action of the cutting-tool, which performs the backing off of the counterbore, as will be explained.
Fig. 33, Sheet 6, is a side elevation of a two-lip counterbore formed by my method and machine, and shown in working position.
Fig. 34, Sheet 6, is an elevation of the counterbore shown in Fig. 33, taken as viewed from the left hand thereof, and shown in working position.
Fig. 35, Sheet 6, is a plan showing the entire circumference of the fluted portion of the two-lip counterbore shown in Fig. 36, the same being shown in this figure as extended or projected in plane, and showing by dotted lines the several cuts made in the act of backing off the end faces of the lips.
Fig. 36, Sheet 6, shows in elevation a radial two-lip counterbore constructed by my method and machine.
Fig. 37, Sheet 6, is an elevation of a radial six-lip counterbore constructed by my method and machine.
Fig. 40, Sheet 6, shows in section the defective operation of a concave-faced counterbore.
Fig. 41, Sheet 6, is a view similar to Fig. 40, but showing the defective operation of a convex-faced counterbore.
Fig. 42, Sheet 6, is a view similar to Figs. 40 and 41, showing the defective operation of a counterbore when the corners of the lips have become rounded by wear.
Fig. 43, Sheet 6, is a view similar to the three preceding, but showing the operation of a counterbore constructed by my method and machine.

In Fig. 41 a reverse defect of the counterbore is shown, as the head of the screw 18 is only seated adjacent to its periphery, instead of having a seat coequal to the under face of the head, as would be the case if the counterbore maintained a right-angled facial line relatively to the axis.

In Fig. 42 the screw 18 fails to be well seated, by reason of defects at the outer line of faces 17 of the counterbore, which fail to cut the recess for the screw-head of uniform diameter to the bottom thereof, as is required.

Fig. 43 shows the screw-head 18 properly seated in the counterbored blank 20, and when thus seated the screw is not liable to become loose by compression of the bearing-surfaces, as it is always liable to do when imperfectly seated, as shown in Figs. 40, 41, 42.

In Fig. 31 the right-hand lip 13 of the counterbore is shown as shorter than the one at the left, which defect is liable to result from lack of uniformity in the clearance or spiral pitch of faces 17 of the counterbores as the same are ground away in sharpening.

It will be obvious that in the manufacture of watches, clocks, and all kinds of accurately-working machinery, it is of the utmost importance that the under face of the screwheads shall be perfectly seated in the circular recess cut by the counterbore, as shown in Fig. 43, in order that the screw may not become lossened by compression, and to relieve its stem 19 from undue strain; and what has been said in relation to the spiral facing or clearance of counterbores applies to the required uniformity of clearance of the several lips or teeth of reamers and countersinks, similar to those shown in Figs. 27, 28, 29, 30, Sheet 7.

The tangential counterbores shown in Figs. 47, 50, Sheet 8, and in Fig. 16, Sheet 4, although usually formed with but two cutting-lips, as before stated, may yet be, and sometimes are, formed with more than that number of lips, especially in the larger sizes.

The impossibility of imparting to each of the several lips of counterbores, reamers, and countersinks by hand-finish, a corresponding pitch or uniform spiral clearance, as has been heretofore attempted, can be readily comprehended when the several conditions attending such effort are duly considered, for such counterbores are required in sizes varying from the thirty-second ($\frac{1}{32}$) of an inch to several inches in diameter; and in all radial counterbores, and in those which are tangential with the lips formed as part of the body, the line of intersection between the end face, 17, and the peripheral face of stem 14 must be clearly maintained in the act of sharpening, and at the same time the angle of face 17 relatively to the axis of said stem at the cutting line or edge must be maintained throughout the extent of the winding-face of the lip, and besides, the same spirality of pitch should be maintained in each and every lip, in order that as all are equally worn away by grinding each will be thereby equally reduced in lineal extent, and thereby each shall perform the same amount of cutting service; and to accomplish these several results automatically, rapidly, certainly, and inexpensively, I have invented the machine next to be described, which is adapted to form the longitudinal grooves which subdivide the lips, and then without removal from place in the machine to form the spiral end face, 17, of the several lips with an identical pitch throughout, and at an invariable angle relatively to the axis, not only in the several lips, but at all points along the face of each and every lip.

Referring, again, to the drawings, 21 represents the bed of the machine on which are mounted the requisite devices by which the blank is held adjusted and grooved, and then without removal from place has the described spiral pitch imparted to the lips by an automatically-acting mechanism; and as the blank is first grooved in said machine I will first describe the devices by which such result is effected, referring to such of the rotating devices as necessarily co-operate therewith.

Upon bed 21 is mounted the head-stock 22. Shown in Figs. 1, 2, 3. In this head-stock is mounted the usual arbor, 23, and on said arbor is the cone pulley 24, by which a belt imparts rotation to the arbor. A chuck, 25, is fitted in the arbor and adapted to receive and hold the body 12 of the counterbore, which is thereby rotated coincident with arbor 23.

Figure 3:
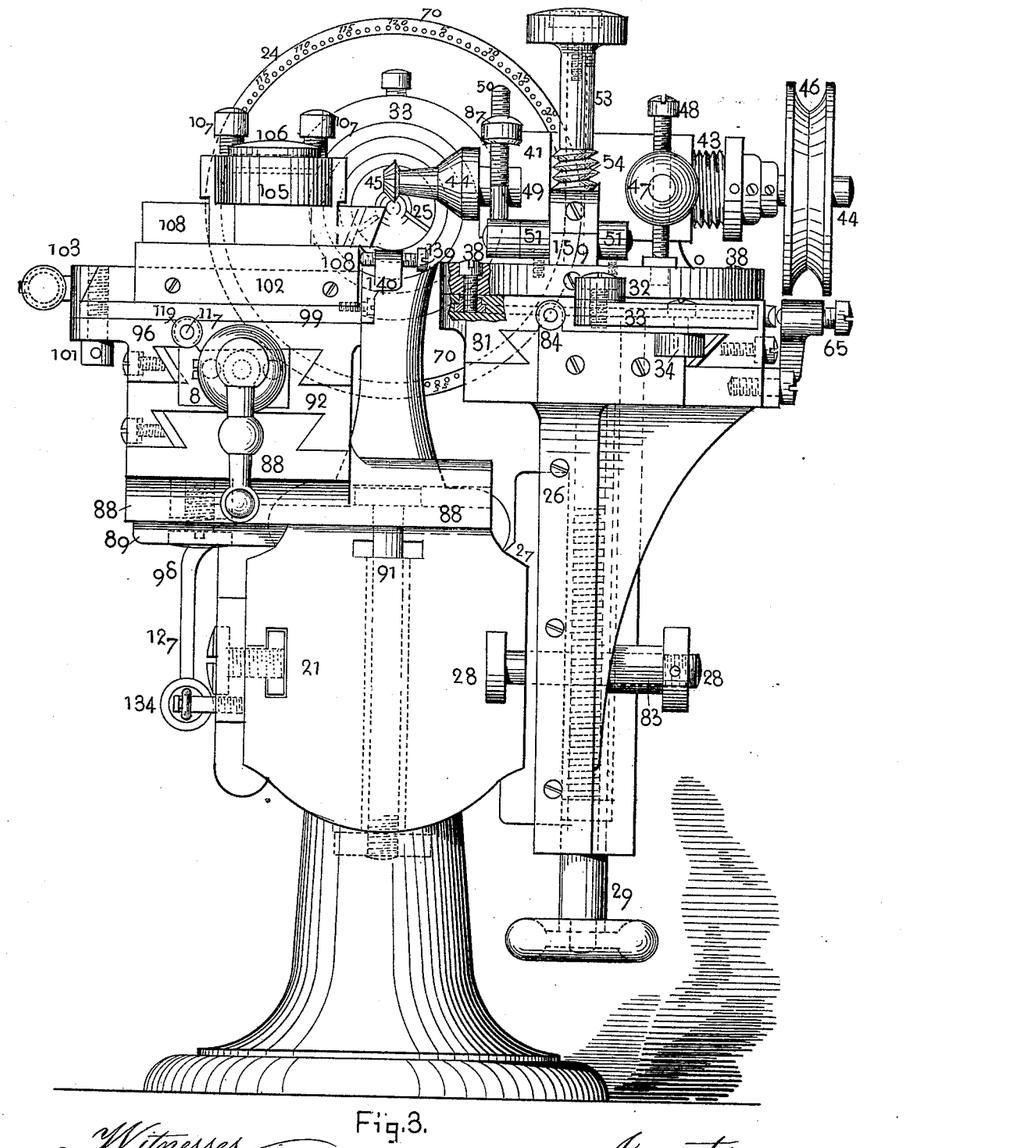
Fig. 3 is an end elevation taken as viewed from the right in Figs. 1 and 2.
Figures 5, 6, 7, 18, 58:
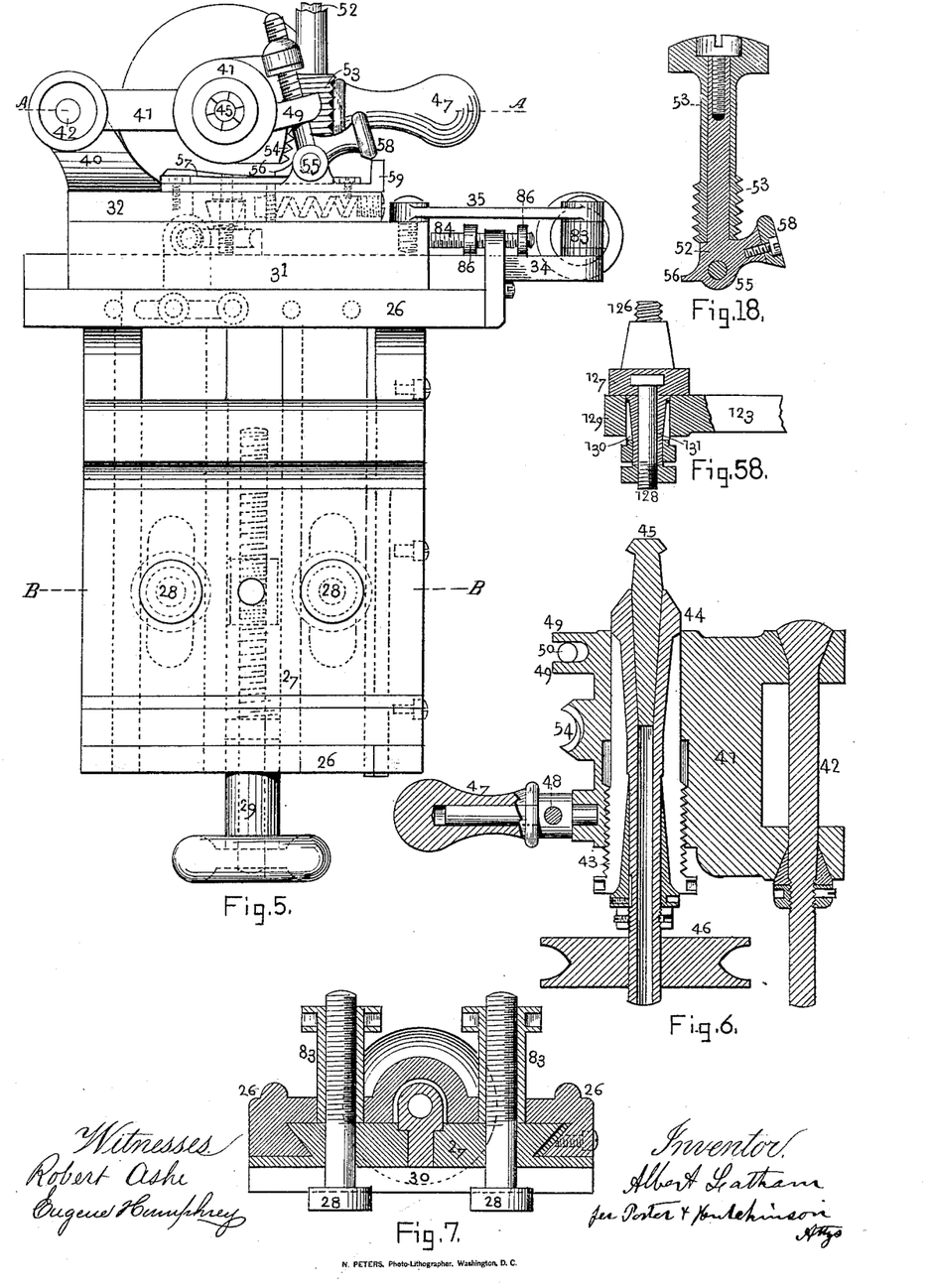
Fig. 5, Sheet 5, is an elevation showing the parts in Fig. 4, and as viewed from the left in that figure.
Fig. 6, Sheet 5, is a horizontal section taken on line A A, Figs. 4 and 5.
Fig. 7, Sheet 5, is a horizontal section taken on line B B, Fig. 5.
Fig. 18, Sheet 5, is a detached sectional view showing a part of my milling-tool-tripping devices.
Fig. 58, Sheet 2, is a horizontal section taken, like Fig. 22, on line E E, Figs. 10, 19, 20, and, like said Fig. 22, omitting certain parts shown in said Fig. 10, but showing the several parts as united or assembled, instead of being in part separated, as in said Fig. 10.

To the lathe-bed 21 the body 26 of the milling-fixture is secured by means of locking-screws 28 and the inside locking-plate, 27, the latter being fitted to a way upon bed 21 as shown in Fig. 3, the heads of locking-screws 28 being seated in a longitudinal T slot formed in the lathe-bed 21, as shown in Fig. 3, the sleeve-like nuts 83 on said screws passing freely through body 26 and bearing upon the locking-plate 27, thereby locking the same firmly to bed 21, the body itself being secured to the plate by a dovetail and gib in the well-known manner, as shown in said Fig. 7; and said body is vertically adjustable upon the locking-plate by means of the adjusting-screw 29, Figs. 3, 4, 5, 7, in which latter figure is shown the nut 30, in which said screw 29 is threaded, the nut being seated in locking-plate 27, as there shown.

Upon the top of body 26 of the milling-fixture I arrange a plate or slide, 31, which is interlocked with said body by a dovetail on the body and corresponding passage in the plate, which latter is accurately adjusted by a gib and set-screws in the well-known manner, and as shown in Figs. 3 and 4.

For the purpose of actuating said slide 31 on body 26 in the direction of the line of bed 21 of the lathe, I pivot a lever, 33, Figs. 1, 3, 4, 5, upon an arm, 34, secured to body 26, and I connect the short arm of said lever with said slide by a link, 35, as shown in said Figs. 1, 3, 4, 5, and by actuating said lever the slide may be moved parallel with bed 21 to the extent desired, and as governed by the check-screw 84, Figs. 1, 3, 4, 5, which is secured in slide 31, and which moves freely in arm 85, secured on body 26, and is provided with the check-nuts 86, by adjusting which relatively to arm 85 the desired scope of movement of the slide may be regulated. A circular rotary plate, 32, Figs. 1, 3, 4, 5, 53, 54, 55, is mounted on sliding plate 31, and is interlocked therewith by means of a concentric T-slot, 36, formed in the upper part of slide 31, Figs. 53, 55, in which slot I insert the T-shaped nuts 37, Fig. 55, in which are threaded the locking-screws 38, which, passing down through said circular plate 32, serve to lock in position, or release the same when thereto actuated, a hollow hub, 39, formed on slide 31, serving, among other purposes to be specified, as the axis of rotation of plate 32. Upon said rotary plate 32 I form a tubular ear, 40, Figs. 1, 2, 3, 4, 5, 54, 55, and to this ear is pivoted the frame 41 by means of pivot-bolt 42, (fully shown in connection with the frame in Fig. 6,) which bolt passes through ears cast on said frame, and through ear 40, which is inserted between the ears on the frame, as shown, thereby allowing said frame to vibrate on said pivot.
In the enlarged central portion of frame 41 I screw-thread a sleeve, 43, Fig. 6, and in said sleeve I journal the arbor 44 in a well-known manner, as shown in said Fig. 6, and so as to compensate for wear, and thereby obviate vibration of the arbor and allow lineal adjustment of the arbor, rotation being imparted to said arbor by a belt acting on its pulley 46, and thereby rotating the milling-tool 45, secured in said arbor, as shown in Figs. 1, 2, 3, 4, 5, 6.

For the purpose of raising and lowering the free or swinging end of pivoted frame 41, I attach thereto a knob or handle, 47, (shown clearly in section in Fig. 6,) and in the shank of this handle, which is secured, as shown, in said frame, I screw-thread the adjustable check-screw 48, arranged to encounter a stop on rotary plate 32, as shown in Figs. 3, 4, and so check the descent of frame 41, according as said screw 48 is vertically adjusted in the shank of said handle.

To check and control the upward vibration of frame 41, a screw-bolt, 50, is pivoted on pin 55, secured in ears 51 of rotary plate 32. This check-bolt is arranged to swing into and out of the slot between ears 49 on frame 41, and it is provided with an adjustable screw check-nut, 87, which, being encountered by said ears 49, arrests the upward vibration of the frame 41 at such point as the nut 87 may be adjusted on its screw 50.

On frame 41 I form an arc of a tangent-wheel, (shown at 54, Figs. 2, 3, 6, and by dotted lines in Fig. 54,) and I arrange a screw-sleeve, 53, Figs. 1, 2, 3, 4, 5, and 18, to engage in and be vibrated out of contact with said tangent-wheel arc by means of the angle-lever 52, Fig. 18, which is pivotally mounted on pin 55, between ears 51 of plate 32, as shown in Fig. 4, said sleeve being arranged to be freely revolved on the vertical arm of said lever 52 by means of the milled head of the sleeve, and it is secured from lineal displacement on said arm by an axial screw threaded therein, as shown in said Fig. 18.

Figures 54, 55, 56, 57:
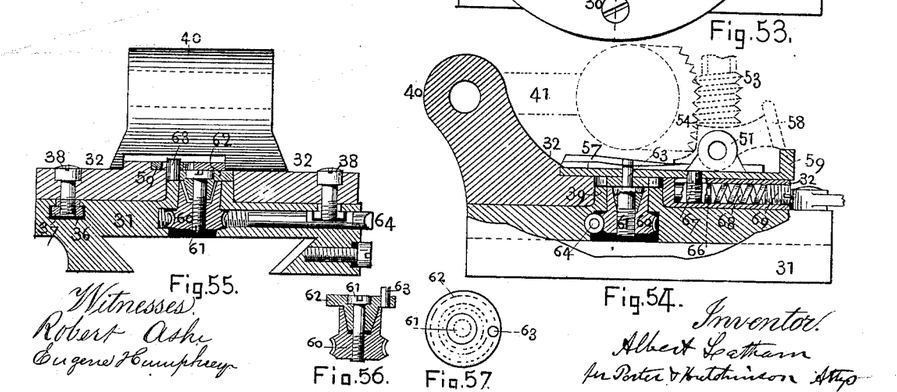
Fig. 54, Sheet 8, is a vertical section taken on line F F, Fig. 53.
Fig. 55, Sheet 8, is a section similar to Fig. 54, but taken on line G G, Fig. 53.
Fig. 56, Sheet 5, is an enlarged detached vertical section, showing the tangent-wheel, the disk thereto secured, and the stud mounted in the disk, as also shown in Figs. 53, 54, 55.
Fig. 57, Sheet 5, is a top or plan view of Fig. 56.

Upon the shorter or horizontal arm of said lever 52 I removably secure, as shown in said Fig. 18, a hardened-steel cap, 58, which, when said sleeve 53 is engaged in arc 54, is engaged and supported by slide 59, Figs. 3, 4, 5, 54, said slide being automatically moved outward to disengage it from cap 58 of lever 52, and returned to engage the same by the following-described means:

In hub 39 of sliding plate 31, Figs. 53,54, I pivot the tangent-wheel 60, Figs. 53, 54, 55, 56, said wheel being interlocked, by means of axial screw 61, with disk 62, which is seated to rotate in the central opening in rotary plate 32, which is seated on hub 39. A threaded slide-rod, 64, engages said wheel, and its outer beveled end is engaged by the adjustable tripper 65, Figs. 1, 4, and when said rod is forced inward by said tripper its threaded engagement with wheel 60 tends to rotate the same in the well known manner of a rack and pinion.

In said disk 62 I fix a pin, 63, which engages in a transverse slot in slide 59, as shown in Figs. 53, 55; hence when rod 64 is forced inward, as stated, and rotates wheel 60, together with disk 62, said pin will force slide 59 outward, thereby disengaging its vertical portion from cap 58 of angle-lever 52, thus allowing the spring 57, Fig. 54, which engages under the toe 56 of said angle-lever, to rock the threaded portion 53 out of contact with the tangent-wheel arc 54, and allowing frame 41 to rise, thus liberating milling-cutter 45 from the cut in counterbore 12. When lever 52 is rocked into contact with arc 54, slide 59 is forced inward, to the position shown in Fig. 54, by spring 68, which is duly compressed by screw-plug 69, and which acts upon plunger 66, which carries stud 67, which engages said slide 59, and the forcing in of said slide serves, through wrist-pin 63, to rotate disk 62, which causes the tangent-wheel 60, secured on said disk, to force outward the tripping-rod 64 preparatory for action. When lever 52 is rocked, so as to bring the threaded sleeve into contact with arc 54, the sleeve may be rotated on the lever to depress frame 41, so as to force the milling-tool 45 downward to give the required depth of cut in the counterbore.

The lathe-spindle 23, in which the counterbore-blank 12 is held while being grooved, as described, is held from rotation during the act of grooving, and is graduated in the degree of its rotary change of position to produce the proper position of the grooves around the counterbore, by means of a series of perforations (shown at 70, Figs. 2, 3) in the plane of the larger "speed" of cone 24, and an engaging-pin, 71, arranged to slide in an arm, 72, secured on head-stock 22 of the lathe, which is arranged to enter said perforations, and so lock the spindle at any point desired.

When it is desired to groove tapering blanks like or similar to those shown in Figs. 27, 28, 29, 30, an auxiliary plate, 73, Figs. 8, 9, is secured to bed 21 of the lathe by means of locking-nuts 75, seated in the T-slot of bed 21, and the short screws 76, which pass through ears 71 of said plate 73 and engage nuts 75, as shown in Figs. 8, 9. A plate, 77, is formed with a concentric dovetail, 78, Fig. 9, which fits into a corresponding recess in plate 73, which recess is formed in one half in the plate itself, and in the other half by gib 81, Figs. 8, 9, said gib fitting into the opening by which projection 78 of plate 77 is inserted into plate 73, and said gib being locked against projection 78 by screw 79, which is threaded in nut 80, which projects from plate 73, said screw engaging and forcing inward the gib 81 against projection 78. When thus arranged, the body 26 of the milling-fixture is secured to outer plate, 77, by bolts 28, Figs. 4, 5, 7, 3, seated in slot 82 of said outer plate, instead of being seated in the slot in bed 21 of the lathe, as before described; and when thus arranged said body 26 may be inclined at any desired angle, so that the slide 31, which moves on the top thereof and carries the milling-cutter, as stated, shall move in a plane coincident with the upper line of the counterbore-blank when the same is conical.

After the required grooves have been cut in the counterbore-blank, as described, it is requisite, both on account of economy in point of cost and for the production of a perfect tool, that it be backed off while yet held in arbor 23 of the lathe, as thereby is avoided the required accurate adjustment of each counterbore, so that its grooves shall coincide with the automatic movement of the backing-off tool, as such circumferential adjustment of the blanks, especially of the smaller ones, would not only consume much time, but would be a work of great difficulty, whereas with the backing-off cam (to be described) once adjusted to a certain number on the locking-index 70, as an initial or starting point, and by inserting the locking-pin 71 at that point when cutting the first groove in the counterbore-blank, then the blank, when grooved, and the cam will always be in proper relations for the automatic backing off of the blank while still held in the arbor of the lathe, as when being grooved.

For the purpose of holding and actuating the backing-off cutter, I employ the following devices: A base, 88, Figs. 1, 2, 3, 11, 12, is provided with an adjustable stop, 89, secured thereto by screw 90, Figs. 2, 11, 12, and is secured upon bed 21 of the lathe by locking-screw 91, Figs. 2, 3, said stop 89 permitting an adjustment of base 88 relatively to bed 21 in a direction transversely thereto, while said base may be adjusted in the lineal direction of said bed and locked in the desired position by said screw 91.

A slide, 92, is dovetailed upon base 88, Figs. 3, 12, while a second slide, 96, is in like manner secured upon slide 92, same figures. The movement of slide 92 is regulated by a check-screw, 93, which is journaled to revolve without lineal movement in base 88, as shown in Fig. 11, and upon this screw is threaded a nut, 94, which by rotation of the screw may be moved to the desired point. Said screw passes loosely through block 95, whose stud engages slide 92, as shown in Fig. 11, and hence the movement of the slide toward head-stock 22 of the lathe is arrested by said nut 94.

In plate 96 is secured a screw-nut, 98, which is engaged by screw 97, which is seated in plate 92, to revolve without lineal displacement, and so adjust plate 96 at any point desired. Upon plate 96 is pivoted, by means of screw-stud 100, plate 99, which is locked in position by screws 101, whose heads bear against the under side of an ear of plate 99, as shown in Figs. 2, 3, 12, and which pass up through an arc-like slot in said projection and are threaded in said plate 99, as shown by dotted and solid lines in Figs. 1 and 11. If desired, said plate 99 may be centrally pivoted, so as to be rotated through an entire circle. A transversely-moving slide, 102, is mounted on plate 99, and is actuated by screw 103, which is journaled in plate 99 and engages nut 104, secured to said slide 102, as shown in Fig. 12. A cap, 105, is secured on the hub of slide 102 by a cap-screw, 106, as shown in said Fig. 12 in section, and also in Figs. 1, 2, 3, 11. Two set-screws, 107, threaded in said cap 105, serve as the means of securing in position the backing-off cutting-tool 108, shown in said figures.

Figure 19:
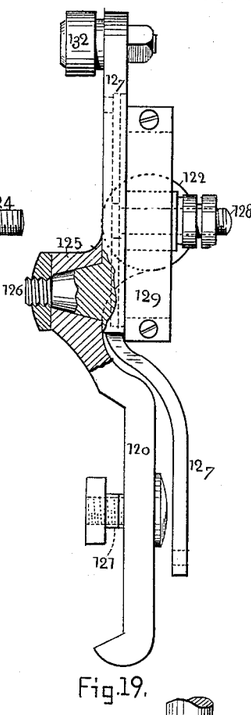
Fig. 19, Sheet 7, is an elevation taken as viewed from the left in Fig. 10.
Figure 20:
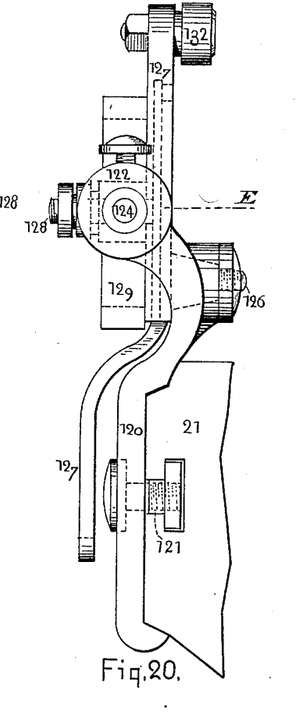
Fig. 20, Sheet 7, is a view like Fig. 19, but taken as from the right in Fig. 10, and showing a part of the lathe-bed.

To the side of bed 21 of the lathe I secure a plate, 120, by means of screw 121, which engages a nut seated in a T-slot in the bed, as shown in Figs. 2, 3, 20, so as to be adjustable on the bed. In the hollow head 122 of said plate is arranged to slide a stem, 123, and a right-and-left-hand threaded screw, 124, is connected at its respective ends in said stem 123, and in plate 92, mounted on base 88, Figs. 1, 2, 10, 11, as described. A lever, 127, is pivoted in a rearward arm, 125, of plate 120, by a conical stud, 126, secured by a nut threaded thereon, as shown in Figs. 19, 20, 21. The upper arm of lever 127 carries a roll or trundle, 132, mounted on a stud secured in the lever, as shown in Figs. 10, 19, 20, 21, which roll encounters and is moved or vibrated by cam 133, carried by arbor 23 of the lathe, said roll being held in contact with the cam by means of the contractile force of spring 134, one end of which is attached to the lower end of lever 127 and the other to plate 135, secured to be adjusted by a set-screw and nut in the T-slot in bed 21, as shown in Figs. 2 and 3.

Figure 10:
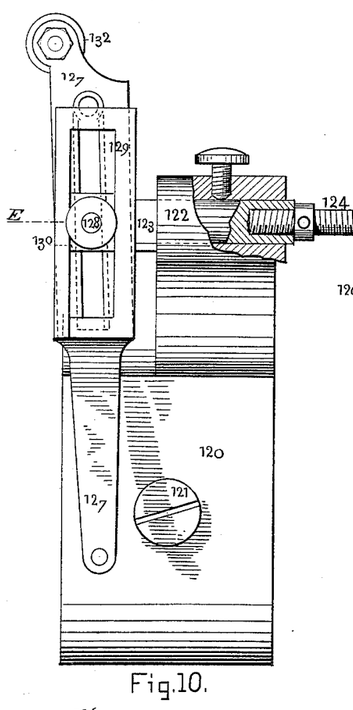
Fig. 10, Sheet 7, is a detached elevation, taken from the standpoint of Fig. 2, and showing the cam-actuated vibrating device by which the backing-off tool is actuated when in the cut.

Upon the end of stem 123 which slides in head 122 of plate 120 is formed three sides of link 129, one side of said link being secured thereto by screws, as shown in Fig. 19. This link is pivoted to lever 127 by the means shown in Figs. 22, 58, in which 128 is a bolt, the head of which is seated in the T-slot in lever 127, there shown in cross-section. On this bolt is a conical sleeve, 131, upon which is fitted and pivoted the block 130, which fits within link 129, as shown in Figs. 2, 10, 22, a locking nut being threaded on said cone to tighten the same in the block to allow pivotal action without backlash, another nut being threaded on bolt 128 to secure the link and lever in proper relation. By adjusting screw 128, with its sleeve and block, relatively to pivot 126 of lever 127 and cam-roll 132, a greater or less lineal movement of stem 123 of the link will be produced by the cam, as the nearer bolt 128 is to pivot 126 the less movement of stem 123 will occur, while the nearer said bolt is to roll 132 the greater will be the lineal movement of stem 123.

Figure 1:
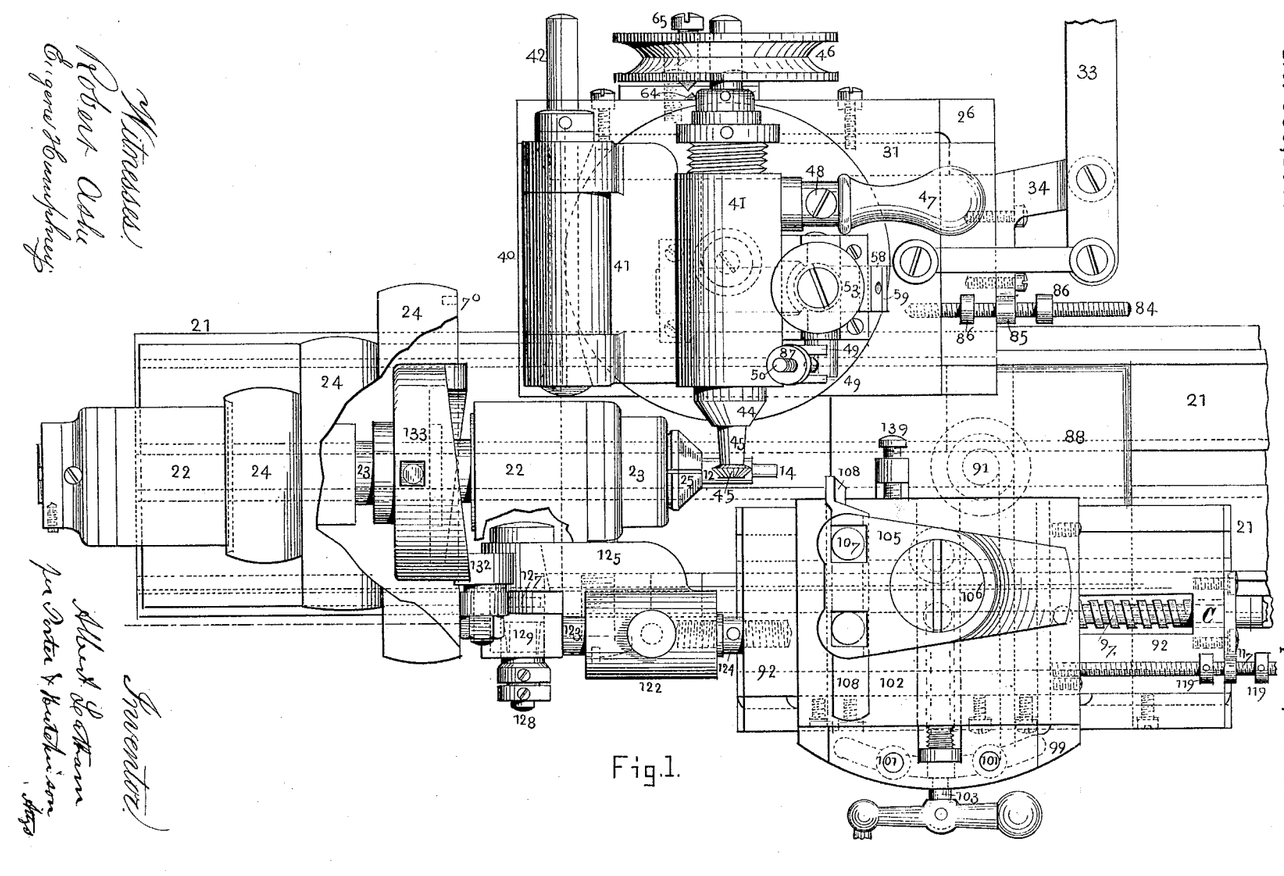
Figure 1 is a top or plan view of my newly-invented machine.
Figure 2:
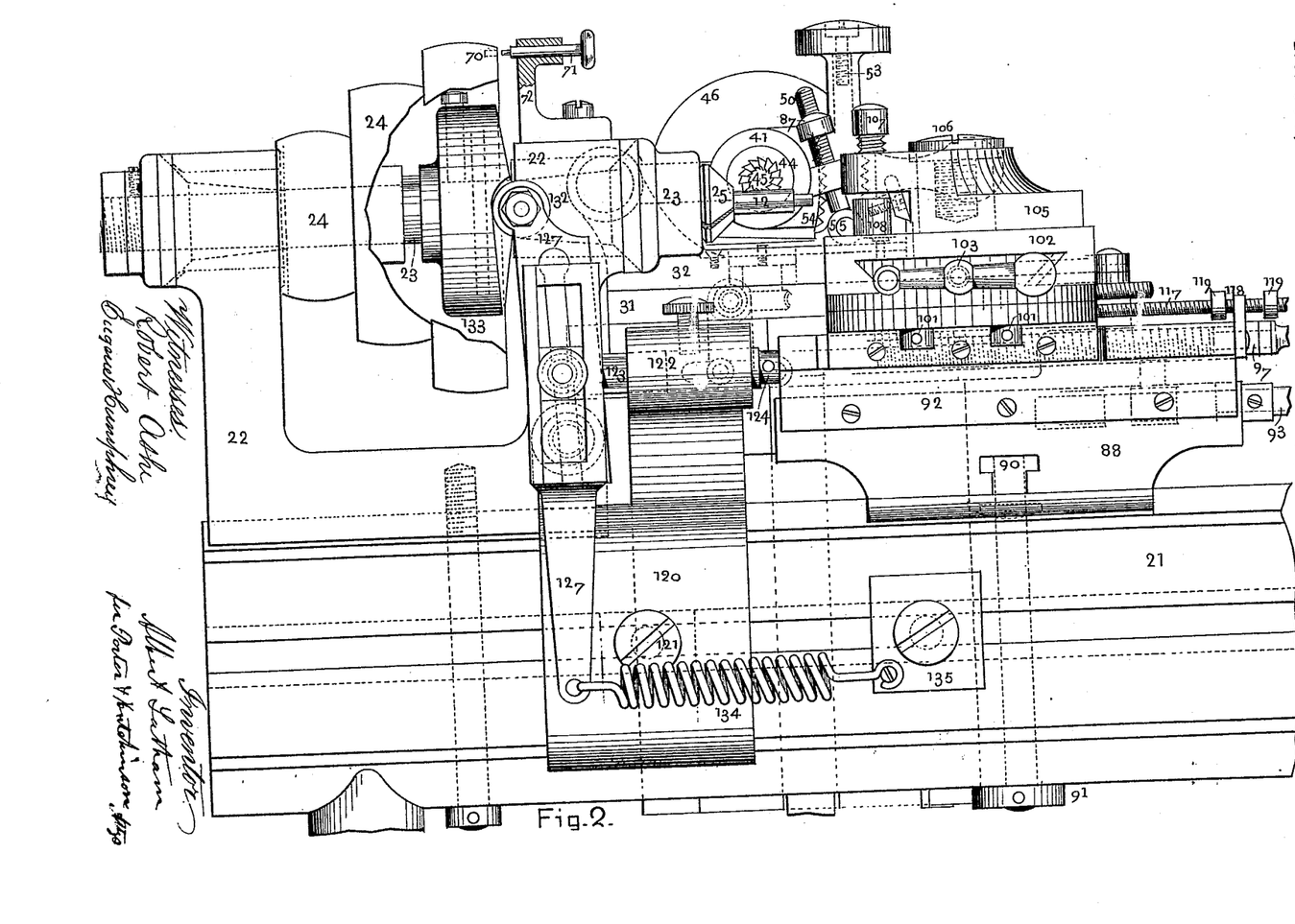
Fig. 2 is a front elevation of the machine shown in Fig. 1, the same being taken as viewed from the right-hand long side in Fig. 1.

For the purpose of governing the extent of movement of sliding plate 96 on 92 a screw, 117, Figs. 1, 2, 3, is at one end secured in plate 96, and passes freely through an arm, 118, secured on plate 92, and is provided with check-nuts 119, arranged on each side of said arm, by which to control the extent of movement that may be imparted to plate 96 by screw 97. When arranged as shown in Figs. 1, 2, cam 133, by its sharp curve 137, clearly shown in Fig. 52, will, by its action on roll 132 of lever 127 while the counterbore is revolving past cutter 108 from the rear line, 16, of one tooth to the front line, 15, of the next tooth, move said cutter in the lineal direction of the counterbore a distance equal to the clearance to be given to the teeth thereof, thus bringing the cutter in position to commence the clearance-cutting on the next tooth, while as roll 132 moves over the long incline 136 of said cam (it being held thereto by spring 134) the cutter acts on the counterbore to form the freeing thereof.

Instead of forming the cam to act as just described, it may be formed and arranged as shown in Fig. 13, whereby the inclines 136, acting on the stud 142, arranged in lever 127, as a substitute for roll 132, serve to move the cutting-tool 108 to cut the oblique end or freeing-faces 17 of the counterbore-blanks, and the drop or offset 138 of the cam allows the returning of the stud by action of a spring, and consequent reverse movement of the cutter away from the end faces of the counterbore, that it may be in position to engage the succeeding tooth thereof. When this class of cam is employed, the spring 134 is arranged to operate from the side of lever 127 opposite to that shown in Fig. 2.

Figure 44:
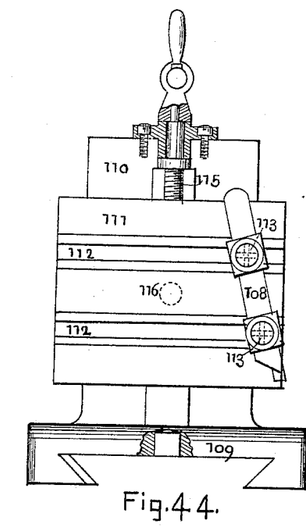
Fig. 44, Sheet 8, is an interchangeable attachment of the lathe for holding, adjusting, and feeding the backing-off cutting-tool when constructing counterbores whose cutting-faces are tangential to the stem.
Figure 45:
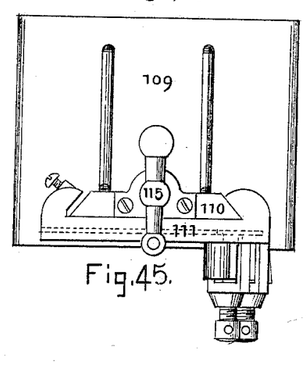
Fig. 45, Sheet 8, is a top or plan view of the parts shown in Fig. 44.

When it is desired to arrange the backing-off tool 108 in a vertical position, as shown in Figs. 44, 45, 46, a plate, 109, having a dovetail standard, 110, is substituted for slide 102, and a plate, 111, is mounted to slide on said standard 110, as shown in said figures, it being vertically adjusted by screw 115, threaded in stud 116, secured in said plate in the usual well-known manner, as shown in Fig. 46, the backing-off tool 108 being secured to said plate 111 by tool-fasts 113, interlocked in T-slots in said plate, as shown in said figures; this method of arranging the backing-off tool being preferable when freeing counterbores of the already-described class, whose cutting-edges are tangential to the center or stem, as it facilitates the required accurate adjustment of said tool relatively to said stem, as shown in Fig. 47, where the tool is shown as arranged both vertically and horizontally, in order to show that a better view of the cutting-edge of the tool is afforded when vertical than when horizontal, and consequently in part beneath said stem, while in Fig. 46 said cutting-tool is shown vertically arranged in connection with a radial counterbore.

For the purpose of adjusting said cutter to the stem of the counterbore, the transversely-moving slide 102 is moved by its actuating-screw 103, and as a gage therefor screw 139, threaded in arm 140, secured to plate 99, serves as a stop to arrest the movement of the slide and cutter when moved into its exact position to act upon the counterbore.

In practice, when first adjusting the described backing-off or freeing devices, screw 139, Fig. 12, is adjusted as described, to allow the prompt and rapid transverse movement of tool 108 to the stem of the counterbore. Bed-plate 88 is properly adjusted, both transversely and lineally, upon bed 21 of the lathe, and is locked in position by screw 91. Nut 94 on screw 93 is moved out of the way of stud 95, to allow plate 92 to be reciprocated by cam 133 and spring 134 the full extent of the throw of the cam, and the check-nuts 119 on check-screw 117 are so adjusted that when slide 96 is moved to the right by screw 97 the extent so limited by screw 117 cutter 108 will be out of the rotary path of the lips of the counterbore, while when said slide 96 has been moved to the left by said screw 97 the distance permitted by said check-screw 117 the cutter 108 will have cut the required clearance upon the counterbore, it being understood that pivotal block 130 is so adjusted in link 129 and lever 127 as to give the required reciprocation to slide 92 and the parts thereon mounted. When thus arranged, the counterbore is put in rotation, and by actuating screw 97 the cutter is moved into cutting contact with the counterbore, first acting on the end face near the rear line, 16, of the lips, and continuing, cut by cut, to increase the length of chip cut from the end face, 17, until the entire face is given the required obliquity or clearance, at which juncture check-screw 117 arrests the movement of the cutter along the counterbore.

Instead of thus controlling and moving the cutter in the act of producing the clearance, the nut 94 may be so far moved to the right that the cam may barely revolve without contact with roll 132 in lever 127, and cutter 108 will be so positioned by screw 97 that the counterbore can barely revolve without its lips being in contact therewith. Then, when the counterbore is put in revolution, nut 94 is gradually moved to the left and the cutter will first act on the end 17 of the lips at the front line, 15, moving from said line 15 at each cut with the obliquity of the clearance till the depth of the allowed cut is attained, and then cutting the balance of the chip at right angles to the axis of the counterbore, such right-angled line of cut being shorter and shorter at each cut, as indicated by the dotted lines 141 in Fig. 35. The advantage of this latter method of controlling the cutting-tool consists in the fact that if it is desired to give to the stem of the counterbore a finishing-cut just before imparting the clearance, which is desirable in small sizes, it may be effected without the cutter moving in the zigzag path, which would be imparted by the cam if it were allowed to act upon lever 127, which would preclude the possibility of imparting a proper finish to the stem.

It will be obvious that cam 133 must have the same number of throws as there are lips in the counterbore, and that these throws must be arranged around the circle coincident with that of the lips around the counterbore.

In practice it is found desirable to form the cam as shown in Figs. 51, 52, where line $b$ represents the point where, by the action of the cam on roll 132 of lever 127, cutter 108 will begin to move out of the cut—that is, away from the end face, 17, of the counterbore—and will so continue to move till said roll rests at line $c$ on the cam, when the cutter will begin moving toward the counterbore, but will not resume its cut thereon till the roll reaches line $d$. This form of the cam is desirable, in order to insure a slightly greater movement of the cutter than is requisite to carry it to the right of the front of the teeth at the junction of lines 15 and 17 thereof.

Referring to Figs. 28, 32, 38, line 16 is the point which would be at the edge of cutter 108 when roll 132 was at line $b$ on the cam, line $a$ in said figures would be the point at the edge of said cutter when said roll would rest at line $c$ on the cam, and line 16 in said figures would be at the edge of said cutter when the roll rested at line $d$ on the cam, thus showing that the roll would have moved down the incline of the cam from $c$ to $d$ before commencing its cut upon the approaching tooth.

In practice it is found preferable to form the lips 13 of the tangential counterbores slightly less in thickness than the diameter of their stem 14, as shown in Figs. 31, 32, 33, 34, 47, 50, as by such form the freeing or clearance is more conveniently effected, as otherwise there would be no space between the rear line of one tooth and the front line of the succeeding tooth, for, as shown in Fig. 32, by reason of the lips 13 being of a thickness less than the diameter of the stem 14, the cutting ceases at line 16, and is not resumed till line 15 reaches the cutter, the space from line 16 to line *a* being allowed for the cutter to be moved away from the counterbore, and from line *a* to line 15 for its return to the cut, as hereinbefore described, and as the sharpening of such counterbores always leaves the same relations between the lips and stem, as shown in Fig. 50, where the dotted lines indicate the part removed by repeated sharpening, therefore the space between the rear line of one lip and the front line of the succeeding one remains practically the same, it being but slightly increased by such sharpening, while the diameter of the counterbore remains positively unchanged until the outer edges or periphery of the lips is entirely removed by such sharpenings, and the angle of end face, 17, at its cutting-edge or junction with front face, 15, remains always the same relatively to the axis of the counterbore.

I claim as my invention—

1. The combination, with a duly organized lathe adapted to hold and rotate the counterbore-blank, of a milling-fixture adapted and arranged to be secured to the bed of the lathe to be moved and adjusted in the lineal direction thereof, and with means by which to vertically adjust it, a slide mounted on said milling-fixture, with means for reciprocating the same in the lineal direction of the lathe-bed, and a tool-carrying arbor journaled upon said slide, with its axis transverse to the line of the lathe bed, and arranged to be rotated in position on said slide, all substantially as specified.

2. In a combined lathe and milling-machine, substantially as specified, the milling-tool arbor mounted upon a bed, constructed, combined, and arranged to be moved and adjusted in a rotary path upon the reciprocating slide, whereby said arbor may be arranged at varied angles relatively to the line of movement of the slide, substantially as specified.

3. In a combined lathe and milling-machine, substantially as specified, the milling-tool arbor and its journal-bearing, combined and arranged to be raised and lowered independent of its supporting-slide, with devices adapted and arranged to automatically liberate said arbor and its said bearing when the intended termination of its grooved path is reached, substantially as specified.

4. In a combined lathe and milling-machine, a milling-fixture adapted and arranged to be adjusted and locked at varied angles relatively to the horizontal plane of the lathe-bed, whereby the reciprocating slide arranged on said fixture may be moved in a line either parallel with or oblique to said plane of the lathe-bed, substantially as specified.

5. In a milling mechanism, in combination with the pivotal arbor-carrying frame 41, having the threaded segment 54 formed thereon, the coincidently-threaded sleeve 53, pivotally arranged to be moved into contact with said threaded segment, and to act therein to depress and lock said frame, substantially as specified.

6. In combination with said frame 41 and sleeve 53, threaded and arranged to co-operate, as specified, pivotal lever 52, having finger 56, the spring 57, acting thereon, and a tripping device adapted and arranged to automatically lock and liberate said pivotal lever, substantially as specified.

7. In combination with pivotal lever 52, its threaded sleeve, and frame 41, the screw or rack 64, with a suitable tripper, 65, to engage and actuate the same, tangent-wheel 60, engaged and rotated by said rack, stud 63, rotated coincidently with wheel 60, slide 58, engaged and actuated by said stud and arranged to lock and trip said lever 52, and a reacting spring to return said rack, slide, and tangent-wheel to first position, substantially as specified.

8. The combination of bed 21 of the lathe, a base-plate, 88, constructed and arranged to be secured thereto, a screw, 93, journaled in said base-plate and carrying a nut, 94, a plate, 92, arranged to slide on base-plate 88 and carrying a stud or stop, 95, to engage said nut, and also carrying a screw, 97, a plate, 96, mounted to slide on plate 92, and having a threaded stud, 98, engaged by screw 97, a plate, 99, pivoted upon and arranged to be rotated and locked on said plate 96, and carrying a screw, 103, and a plate, 102, mounted upon plate 99, and arranged to be actuated in a direction transverse to the axis of the lathe, and provided with devices for holding the cutting-tool, substantially as specified.

9. In combination with the devices arranged to be moved both transversely to and in the direction of the axis of the lathe, and to so move the cutting-tool, as specified, a cam arranged upon the lathe-arbor and subdivided coincidently with the number of grooves in the counter-bore a lever arranged to be engaged and actuated by said cam, and a connecting-rod actuated by said lever and connected with and arranged to actuate the devices carrying the cutting-tool, substantially as specified.

10. The combination of a suitably-subdivided cam arranged upon the lathe-arbor, lever 127, pivoted in adjustable plate 120, link 129, having rod 123, connected with plate 92, and an adjustable pivot connecting said lever and link, whereby the motion imparted to said lever by the cam may be imparted to said link and its reciprocating rod 123 in varied degrees, as desired, substantially as specified.

11. The combination of the non-traveling screw 93 and its nut 94, sliding plate 92, having a stud, 95, arranged to encounter said nut when reciprocated, and also carrying the transversely-moving tool-carrying devices, a cam duly formed, spaced, and mounted to rotate, and connected with slide 92 by interposed devices adapted and arranged to impart thereto a reciprocating movement graduated by the position of said nut upon its actuating-screw, substantially as specified.

12. The combination of sliding plates 92 and 96 with screw 97, arranged to actuate plate 96, the tool-carrying and transversely-actuating devices mounted on slide 96, a cam duly formed, spaced, and mounted to rotate, and connected with slide 92 by interposed devices adapted and arranged to impart thereto a reciprocating movement produced by the rotation of the cam independently of the feeding movement imparted to the cutting-tool by the action of said screw upon slide 96, substantially as specified.

ALBERT LATHAM.

Witnesses:
T. W. PORTER,
ROBERT ASHE.